(12) United States Patent
Baker

(10) Patent No.: US 6,902,787 B2
(45) Date of Patent: Jun. 7, 2005

(54) INDUSTRIAL FABRIC WITH ASYMMETRICALLY APERTURED TILES

(75) Inventor: Sam Baker, Carleton Place (CA)

(73) Assignee: AstenJohnson, Inc., Charleston, SC (US)

(*) Notice: Subject to any disclaimer, the term of this patent is extended or adjusted under 35 U.S.C. 154(b) by 69 days.

(21) Appl. No.: 10/471,766

(22) PCT Filed: Mar. 18, 2002

(86) PCT No.: PCT/CA02/00370
§ 371 (c)(1),
(2), (4) Date: Sep. 16, 2003

(87) PCT Pub. No.: WO02/074529
PCT Pub. Date: Sep. 26, 2002

(65) Prior Publication Data
US 2004/0109972 A1 Jun. 10, 2004

(30) Foreign Application Priority Data
Mar. 19, 2001 (GB) .............................. 0106776

(51) Int. Cl.⁷ ................................................ B32B 3/10
(52) U.S. Cl. ........................... 428/48; 428/47; 428/53; 428/56; 428/61; 428/137; 428/223
(58) Field of Search .............................. 428/44, 47, 48, 428/53, 56, 137, 223, 61

(56) References Cited

U.S. PATENT DOCUMENTS

| | | |
|---|---|---|
| 4,469,221 A | 9/1984 | Albert |
| 4,537,658 A | 8/1985 | Albert |
| 4,541,895 A | 9/1985 | Albert |
| 4,579,771 A | 4/1986 | Finn et al. |
| 4,842,905 A | 6/1989 | Stech |
| 5,797,170 A | 8/1998 | Akeno |

FOREIGN PATENT DOCUMENTS

| | | |
|---|---|---|
| CA | 2 300 590 | 9/2000 |
| DE | 34 44 082 A | 8/1986 |
| DE | 37 35 709 A1 | 10/1987 |
| EP | 0802280 A2 | 10/1997 |
| EP | 1 035 251 A1 | 9/2000 |

OTHER PUBLICATIONS

"Standard Test Method for Air Permeability of Textile Fabrics 1"—ASTM Designation: D 737–96, Mar. 2002.

Primary Examiner—Alexander S. Thomas
(74) Attorney, Agent, or Firm—Shapiro Cohen

(57) ABSTRACT

A permeable industrial fabric is assembled from a plurality of separate tiles into at least two plies, and in which the two plies are held together by jointing structures made integrally with the tiles. In these fabrics, within each tile the jointing structures are incorporated at primary selected locations according a symmetrical pattern, and the apertures in the tiles which provide the required fabric permeability are incorporated at secondary and tertiary selected locations according two more patterns, at least one of which is asymmetrical. This combination of symmetry and asymmetry allows for some control over the permeability of the assembled fabric.

17 Claims, 11 Drawing Sheets

INDUSTRIAL FABRIC WITH ASYMMETRICALLY APERTURED TILES

This invention relates to a permeable industrial fabric of the type which is assembled into at least two plies from a plurality of separate tiles including apertures and in which the two plies are held together by jointing structures made integrally with the tiles. In the fabrics of this invention, within each tile the jointing structures are incorporated at primary selected locations according a symmetrical pattern, and the apertures in the tiles which provide the required fabric open area are incorporated at secondary and tertiary selected locations according two more patterns, at least one of which is asymmetrical. This combination of symmetry and asymmetry allows for some control over the open area of the assembled fabric.

Until relatively recently, most fabrics, including so-called industrial fabrics, were assembled from at least one ply which was made by weaving or an equivalent thereof, such as knitting, braiding, felting and the like. More recent practise has utilised plastic mouldings, generally termed "tiles", as the basic units for the plies used in industrial fabrics. These parts are also known as "components", "modular elements" and "elements"; for simplicity only the term "tile" will be used hereafter.

An industrial papermaking fabric consisting of such plastic tiles is known, for example, from DE 34 44 082 A1. An upper tile of this known fabric is provided with a first sequence of apertures of substantially rectangular shape extending in the cross machine direction, whereas the lower tile is provided with a second sequence of apertures also having a substantially rectangular shape extending in the machine direction of the paper making fabric. The apertures in the lower tile are of a size larger than the apertures in the upper tile. The apertures in the lower tile communicate with two apertures in the upper tile.

The use of tiles offers several advantages. It is possible to create a fabric with a topography on either or both of its surfaces which cannot be obtained using weaving, and related, technology. It is possible to create a fabric in which the two outer surfaces are significantly different. It is possible to use polymer materials in the tiles which are not amenable to current fibre making technology, and are not available as either monofilament, multi strand yarn, or spun monofilament yarn. Further, since the tiles are attached to each other by integral jointing structures which need not be located along the periphery of the tiles, it is possible to create a large area of fabric, or a loop of fabric, having a high tensile strength without any apparent seams, such as paper making machine fabrics where any perceptible difference in fabric permeability caused by the presence of a seam can cause unacceptable defects in the paper product being made.

If the design of the tiles is chosen with care, it is also possible to include fibres or monofilaments between the plies of a multi-ply fabric, thus transferring tensile loads from the joints between the tiles to the fibres.

In the known two, or more, ply industrial fabrics, the tile design largely determines the properties of the fabric. If different fabric properties are desired, a different design of tile has to be used.

It has now been realised that, with careful design of the tile used in a fabric, it is possible to pre-select the open area of the assembled fabric. As will be discussed in more detail below, the fabric open area is directly related to the fabric permeability when measured under standard test conditions. In the industrial fabrics according to this invention, the tiles in each of at least two plies include integral jointing structures which are arranged in the tiles in a first symmetrical pattern, with the consequence that when the tiles are superposed upon each other to bond the plies together the tiles in one ply can be differently oriented relative to the other ply and yet will still bond together. The tiles used in each ply also include apertures, which are arranged in each of the sets of tiles in patterns, at least one of which is asymmetrical. Since the open area is determined by the overlap of the apertures in the sets of tiles making up each ply, the use of at least one asymmetric pattern for the apertures allows a larger choice of open area, over a range of from complete aperture overlap, to the minimum possible aperture overlap. The orientation of the tiles in one ply relative to the tiles in another ply will determine the relative positions of both the symmetrically arranged jointing structures and the apertures, at least one set of which is asymmetrically arranged, thus controlling the open area of the assembled fabric. It is thus also apparent that the maximum open area is determined by the proportion of the area of each tile which can be taken up by the apertures and yet still retain a desired level of mechanical strength and a desired level of flexibility in the assembled fabric. It is also apparent that the number of different orientations of one set of tiles relative to the other will be greatest when the patterns used for the apertures in both sets of tiles are asymmetrical. From this it then follows that two ply fabrics of different open areas can be assembled from just one design of tile. This capability to control the open area in the fabric also makes it possible to control fabric permeability.

Thus in its broadest embodiment this invention seeks to provide an industrial fabric having a preselected permeability, including at least a first ply, consisting of a first set of tiles, and a second ply, consisting of a second set of tiles, attached to each other, each of which plies includes a plurality of tiles, wherein:

(a) each tile includes integral jointing structures incorporated into the tile at primary selected locations in a first symmetrical pattern which also defines a grid pattern on at least one surface of the tile;

(b) each tile in the first set of tiles includes at least a first sequence of apertures of the same size and shape incorporated into the tile at secondary selected locations in a second pattern;

(c) each tile in the second set of tiles includes at least a second sequence of apertures of the same size and shape incorporated into the tile at tertiary selected locations in a third pattern;

(d) the jointing structures incorporated into each tile comprise formed structures which engage with, and interlock with, each other to provide a joint between superposed tiles;

(e) in the assembled fabric the first symmetrical pattern extends in the plane of each ply;

(f) in the assembled fabric the second and third patterns both extend in the plane of each ply;

(g) at least one pattern chosen from the group consisting of the second pattern and the third pattern is asymmetrical with respect to the symmetry axes of the first pattern; and (h) the superposed plies are jointed together with the first symmetrical pattern and second pattern in the first ply oriented relative to the first symmetrical pattern and the third pattern in the second ply to provide an assembled fabric with the preselected permeability.

Preferably, both the second pattern and the third pattern are asymmetrical with respect to the symmetry axes of the first pattern. Alternatively, the second pattern is symmetrical and the third pattern is asymmetrical with respect to the symmetry axes of the first pattern.

Alternatively, the relationship between the tiles in the first set and the tiles in the second set is chosen from the following options:

(i) the tiles in the first set and the tiles in the second set are the same, and both the second pattern and third pattern are asymmetrical with respect to the symmetry axes of the first pattern;

(ii) in the tiles in the first set and the tiles in the second set, the second pattern is not the same as the third pattern;

(iii) in the tiles in the first set and in the tiles in the second set, the apertures in the first sequence are the same shape as the apertures in the second sequence, the apertures in the first sequence are not the same size as the apertures in the second sequence, and both the second pattern and third pattern are asymmetrical with respect to the symmetry axes at the first pattern;

(iv) in the tiles in the first set and in the tiles in the second set, the apertures in the first sequence are the same shape as the apertures in the second sequence, the apertures in the first sequence are not the same size as the apertures in the second sequence, and the second pattern is not the same as the third pattern;

(v) in the tiles in the first set and in the tiles in the second set, the apertures in the first sequence are not the same shape as the apertures in the second sequence, the apertures in the first sequence are not the same size as the apertures in the second sequence, the second pattern is the same as the third pattern, and both the second pattern and third pattern are asymmetrical with respect to the symmetry axes of the first pattern;

(vi) in the tiles in the first set and in the tiles in the second set, the apertures in the first sequence are not the same shape as the apertures in the second sequence, the apertures in the first sequence are not the same size as the apertures in the second sequence, and the second pattern is not the same as the third pattern;

(vii) in the tiles in the first set the sequence of apertures in the second pattern is within a space defined by the grid pattern;

(viii) in the tiles in the first set the sequence of apertures in the second pattern is not within a space defined by the grid pattern;

(ix) in the tiles in the second set the sequence of apertures in the third pattern is within a space defined by the grid pattern; and (x) in the tiles in the second set the sequence of apertures in the third pattern is not within a space defined by the grid pattern.

Preferably, the fabric includes a first set of tiles forming the first ply, and a second set of tiles forming the second ply, wherein:

(a) in the tiles of the first set, each tile includes integral jointing structures incorporated into the tile at first primary selected locations in a first symmetrical pattern defining a first grid pattern;

(b) in the tiles of the second set, each tile includes integral jointing structures incorporated into the tile at second primary selected locations in a first symmetrical pattern defining a second grid pattern; and (c) the linear separation $S_2$ of adjacent jointing structures on an axis of the first grid pattern is related to the linear separation $S_1$ of adjacent jointing structures on the same axis of the second grid pattern by the relationship $S_2=nS_1$, in which n is an integral number.

Preferably, the fabric includes a first set of tiles forming the first ply, and a second set of tiles forming the second ply, wherein:

(a) in the tiles of the first set, each tile includes integral jointing structures incorporated into the tile at first primary selected locations in a first symmetrical pattern defining a first grid pattern;

(b) in the tiles of the second set, each tile includes integral jointing structures incorporated into the tile at second primary selected locations in a first symmetrical pattern defining a second grid pattern;

(c) the linear separation $S_2$ of adjacent jointing structures on an axis of the first grid pattern is related to the linear separation $S_1$ of adjacent jointing structures on the same axis of the second grid pattern by the relationship $S_2=nS_1$, in which n is an integral number;

(d) each tile in both the first set and the second set includes a first sequence of apertures incorporated into the tile at first secondary selected locations in a fourth pattern;

(e) each tile in both the first and the second set includes a second sequence of apertures incorporated into the tile at second secondary selected locations in a fifth pattern; and (t) at least one pattern chosen from the group consisting of the fourth pattern and the fifth pattern is asymmetrical with respect to the symmetry axes of the first pattern.

More preferably, the tiles include a jointing structure including a first part and a cooperating second part, the first set of tiles includes both the first part and the second part of the jointing structure, and the second set of tiles includes both the first part and the second part of the jointing structure. Additionally, either the first part of the jointing structure is the same as the second part of the jointing structure, or the first part of the jointing structure is not the same as the second part of the jointing structure.

It can thus be seen that by combining within the tiles the two concepts of a symmetrical arrangement for the jointing structures, and an asymmetrical arrangement for at least one of the sets of apertures, the number of possible orientations in which the tiles making up just two plies can be combined is quite high. Even when only one quite simple tile design is used, such as a combination of jointing structures located to a square pattern, combined with two sets of rectangular apertures of differing size and shape, each set of which is arranged to its own asymmetric pattern, the number of possible combinations can provide a fabric having at least seven different levels of open area. When this concept is taken to a three layer fabric still using the same tiles to make up all three plies, the number of theoretically possible combinations is even higher: the theoretically possible number of combinations will be 49; i.e. for each of the seven ways of orienting the first and second plies, there are seven ways of adding the third ply. The number of useful combinations will be somewhat lower, because at least some of these possibilities will provide fabrics with the same open areas. However, although the open area is the same, the open spaces through the assembled fabric will likely be differently shaped, be of different sizes, and/or be differently located.

In the context of this invention, the following terms have the given meanings:

"open area": the proportion of a defined unit area of an assembled fabric that is open space, and which is usually expressed as a percentage;

"permeability": the rate of air flow passing perpendicularly through a known area under a prescribed pressure differential between the two surfaces of the assembled fabric, expressed as litres/hour/square meter and determined according to the method described in ASTM D 737-96;

"tile": one of the units from which a ply is assembled;

"ply": a layer in an assembled fabric which comprises a plurality of tiles assembled edge-to-edge;

"fabric": at least two plies;

"grid pattern": the notional lines on the surface of a tile, and equally on the surface of a ply, defined by the rows of jointing structures;

"space defined by the grid pattern": a notional area within the grid lines, which can be the same as, or larger than, the minimum size space defined by adjacent jointing structures;

"aperture": an open space in a tile; a tile may include one, or more than one, aperture;

"aperture shape": the geometric shape of an aperture, for example a square, a rectangle, a triangle, a circle, an ellipse, or even an irregular shape;

"aperture size": the area of an individual aperture; and

"orientation": the relationship between the location of the jointing structures and the apertures in one tile relative to both the tiles around it in the same ply, and to tiles jointed to it in another ply; thus all of the tiles within a ply will normally have the same orientation with respect to each other, but the tiles in each of two, or more, jointed plies need not have the same orientation.

Some embodiments of the invention will now be described by way of reference to the attached drawings in which.

Figure 1:
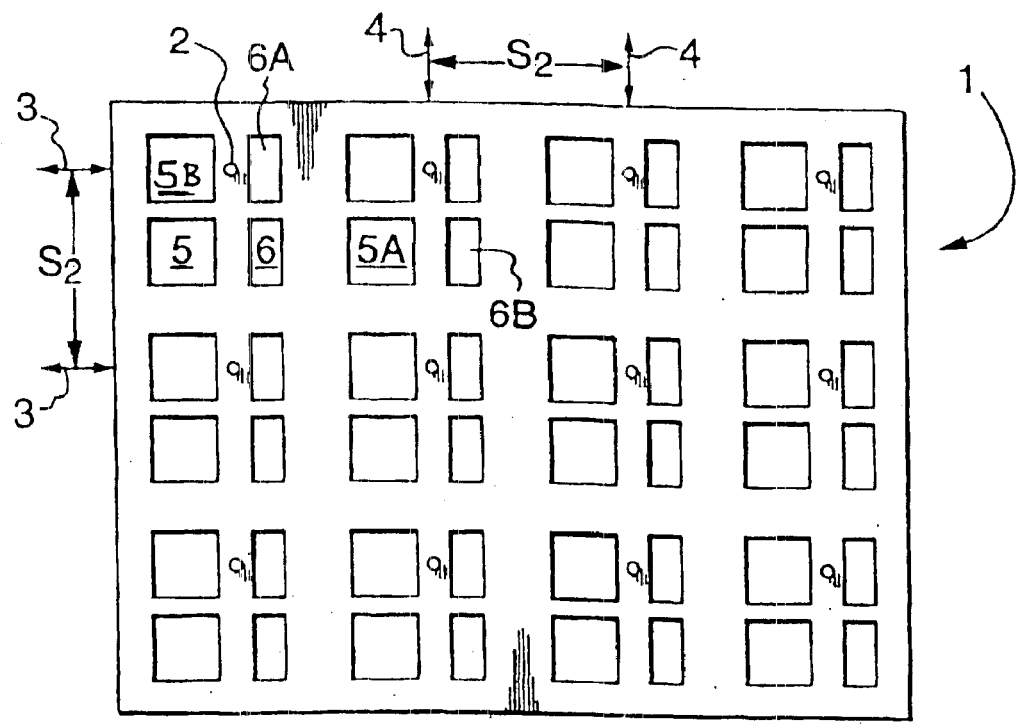
FIG. 1 shows the first of a pair of cooperating tiles.
Figure 2:
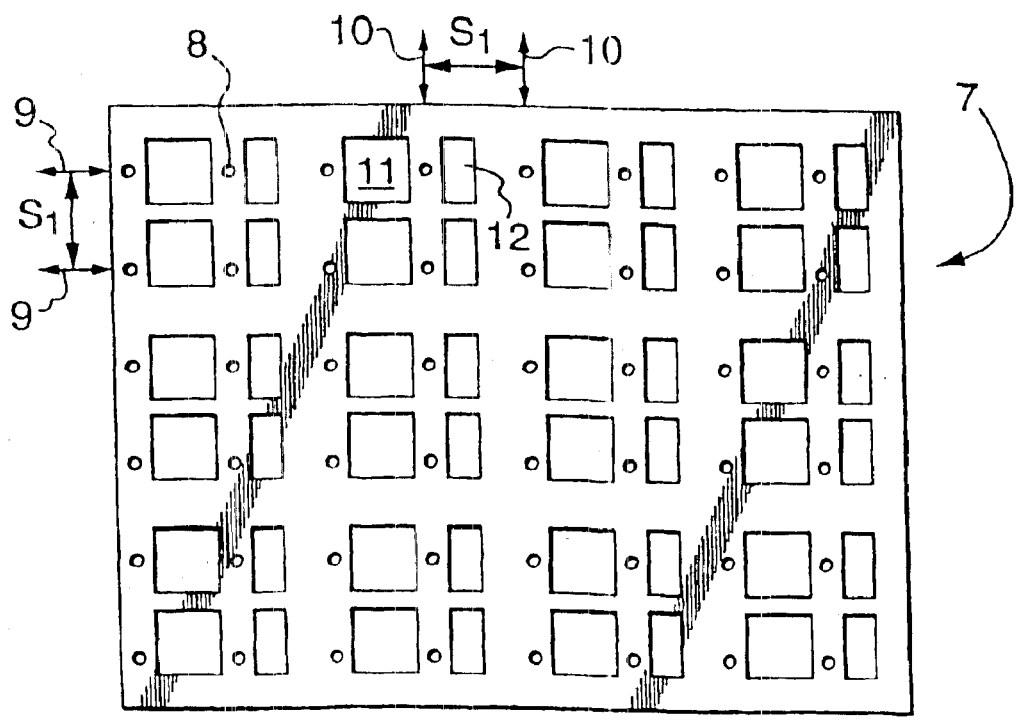
FIG. 2 shows the second of a pair of cooperating tiles.

The tiles shown in FIGS. 1 and 2 show many of the features of this invention. In the following description of FIGS. 1 and 2 it is assumed that the assembled fabric contains only two plies. One ply will contain tiles as shown in FIG. 1, and the other ply will contain tiles as shown in FIG. 2.

The tile shown generally as 1 in FIG. 1 is substantially rectangular. Upstanding pins 2 are incorporated into the tile 1 at primary selected locations in a first symmetrical pattern. The pins 2 are the male half of the jointing structure which holds the two plies together. The pins 2 are arranged in rows and columns which extend in the directions of the arrows 3 and 4. The separation between the rows 3 and the columns 4 is the same, as indicated by the distance $S_2$. It can thus be seen that the first symmetrical pattern, and hence the grid pattern, is a repeating square. The minimum space defined by the grid pattern is one square with a pin 2 at each corner; if desired, a larger defined space including several squares can be used.

The tile 1 also includes two sequences of apertures. The first sequence of larger apertures 5 is placed in the tile at secondary selected locations. Inspection of FIG. 1 shows that the distance between adjacent large apertures 5, for example between large apertures 5 and 5A in one direction, and between large apertures 5 and 5B in the other direction, is not constant. It is thus apparent that the secondary locations selected for the sequence of larger apertures 5 conform to a second asymmetrical pattern. The second sequence of smaller apertures 6 is placed in the tile at tertiary selected locations. Inspection of FIG. 1 also shows that the distance between adjacent small apertures 6, for example between small apertures 6 and 6A in one direction, and between small apertures 6 and 6B in the other direction, is not constant. It is thus apparent that the secondary locations selected for the sequence of smaller apertures 5 conforms to a third asymmetrical pattern. It can also be seen that this tile includes three patterns: the first pattern is symmetrical, and the second and third patterns are each asymmetrical. In this instance, the second and third patterns are also substantially the same, and are located differently with respect to the grid pattern. Further, when the two asymmetrical patterns for the larger and smaller apertures are taken together, the combined repeating pattern is still asymmetrical. Further inspection of this tile shows that combination of the areas of all the apertures 5 and 6 gives an open area of approximately 27% of the tile area. It can also be seen that in the tile 1 the notional lines of the grid pattern defined by the location of the pins in one direction passes through the apertures, and in the other direction passes between them.

The tile 7 shown in FIG. 2 includes holes 8, which are the female half of the jointing structure. The holes 8 extend in a grid pattern defined by the notional lines 9 and 10, in each direction. In both directions, the grid lines 9 and 10 are separated by the distance $S_1$. Comparison of the tiles 1 and 7 shows that both grid patterns are the same, as both are a repeating square. The tile 7 differs from the tile 1 in the relationship between the distances $S_1$ and $S_2$. In these two tiles, $S_2=2S_1$. The tile 7 also includes two sets of apertures, comprising the larger apertures 11 and the smaller apertures 12. Comparison with FIG. 1 shows these are arranged to the same two asymmetric patterns as those used in tile 1 for the apertures 5 and 12. Since the apertures 5 and 11 are the same size, and the apertures 6 and 12 are the same size, the open area for the tile 7 is the same as that of tile 1 at approximately 27%. It can also be seen that in the tile 7 the notional lines of the grid pattern defined by the location of the pins in one direction passes through the apertures, and in the other direction passes between them.

To assemble a two ply fabric from the tiles 1 and 7, the pins 2 are engaged in the holes 8. Since each ply will include each tile in the same orientation, it is easiest to consider the orientations in which only two superposed tiles can be jointed together. In practise, after jointing the assembled fabric will normally be passed through a pair of heated press rolls to deform the protruding ends of the pins 2 to enhance joint integrity.

Figure 3:
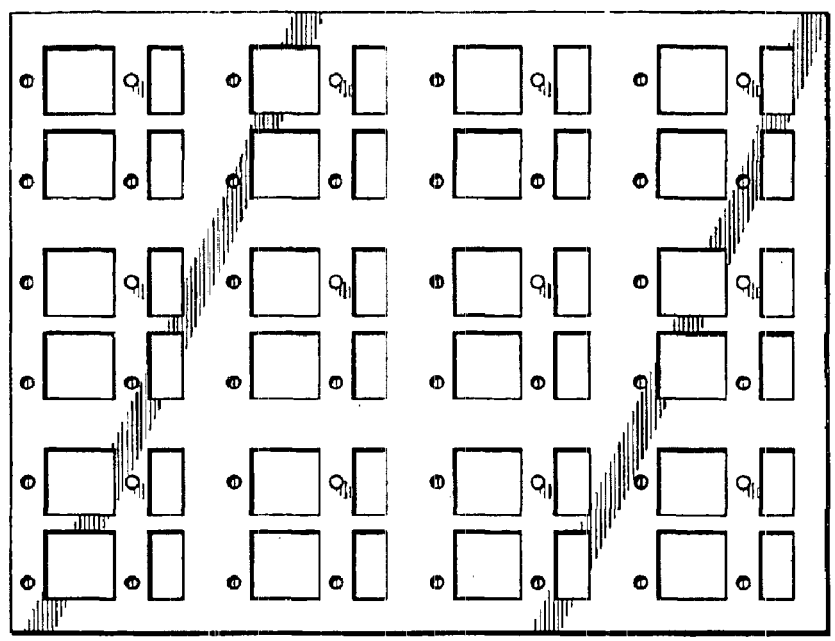
FIGS. 3–18 show schematically the orientations in which the tiles of FIGS. 1 and 2 can be jointed together.
Figure 4:
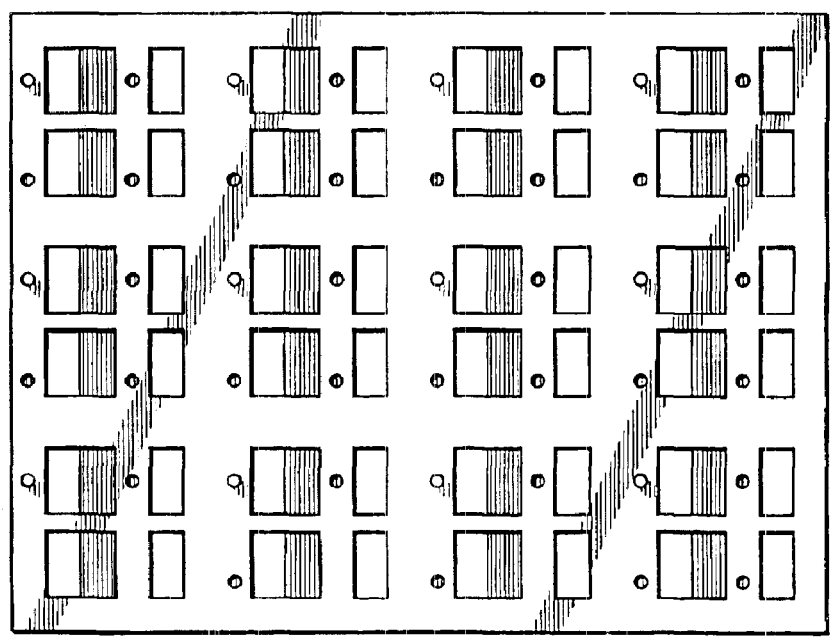
Figure 5:
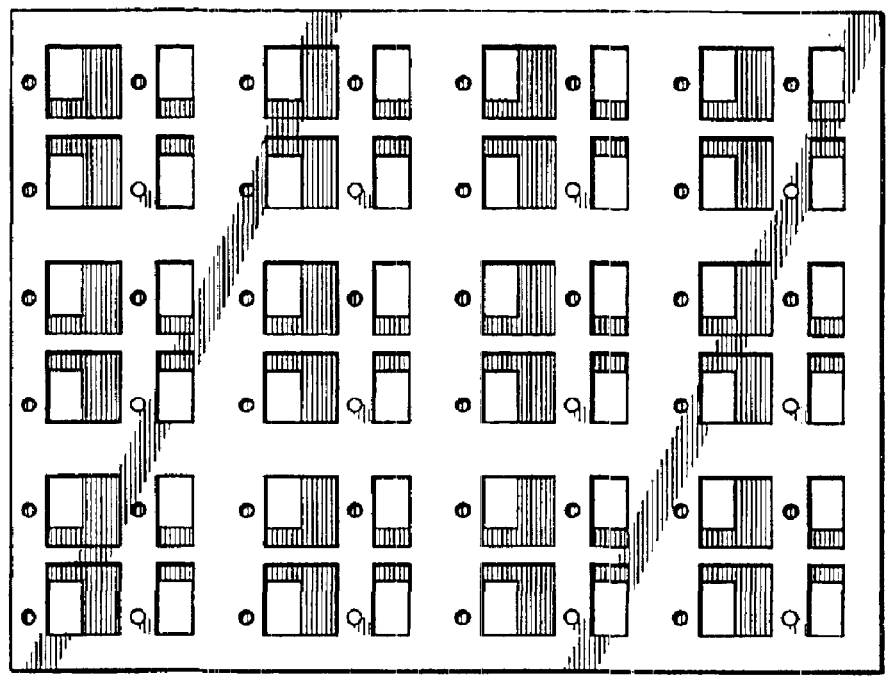
Figure 6:
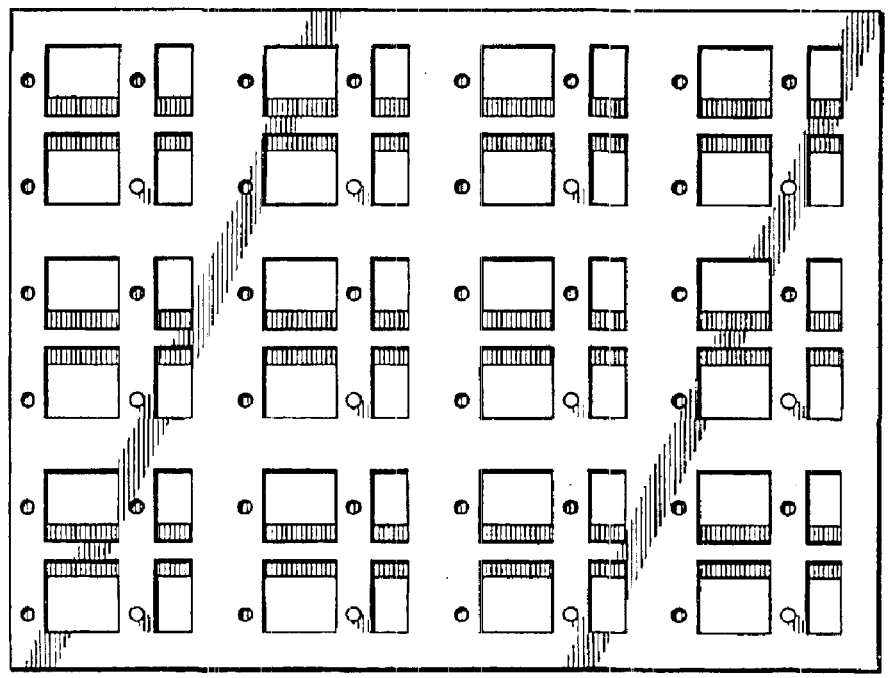
Figure 7:
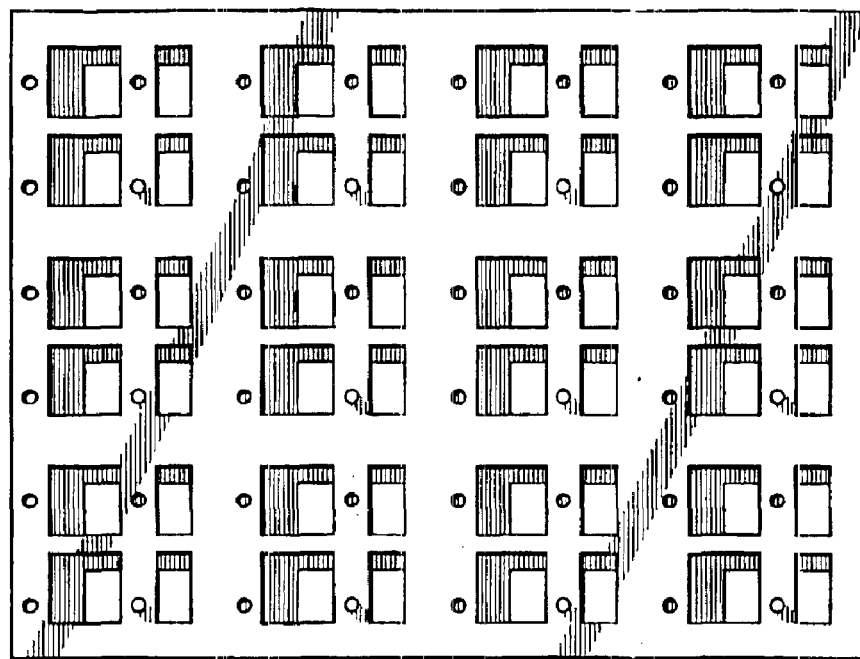
Figure 8:
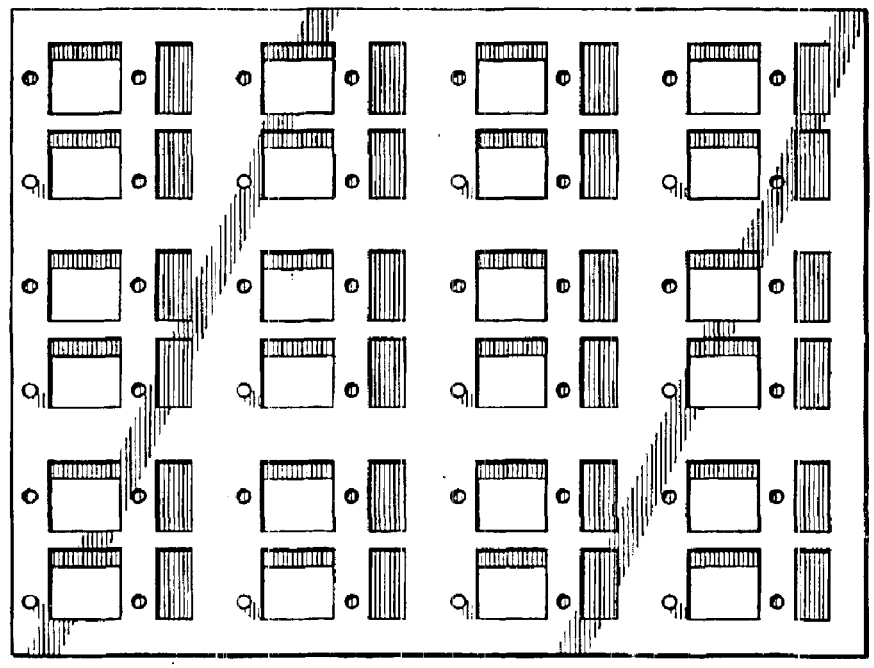
Figure 9:
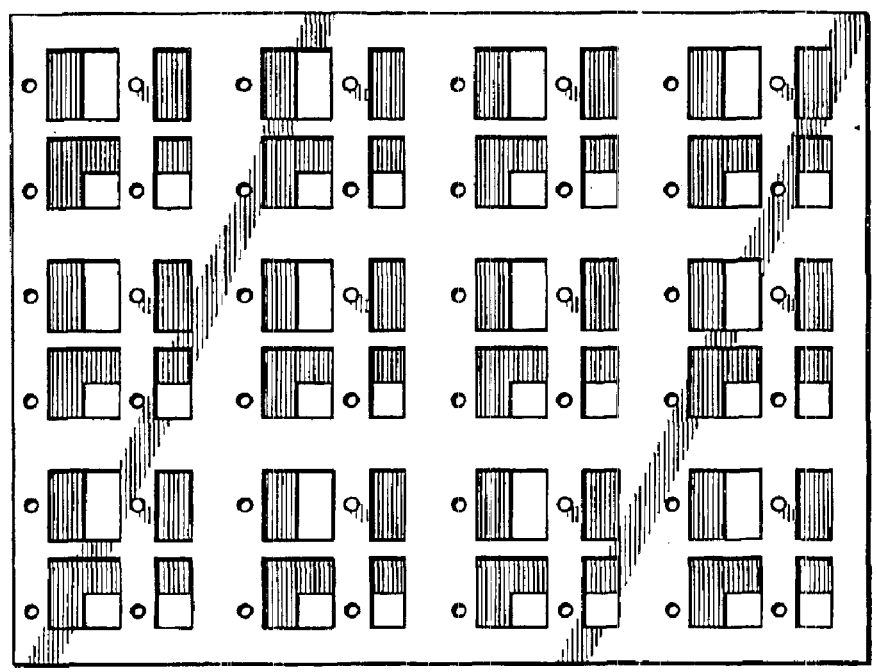
Figure 10:
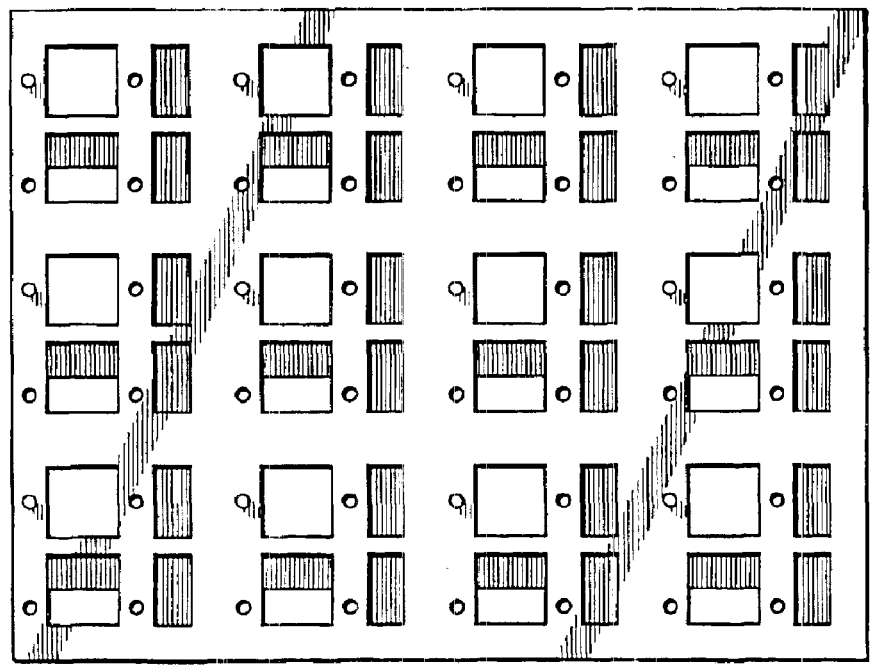
Figure 11:
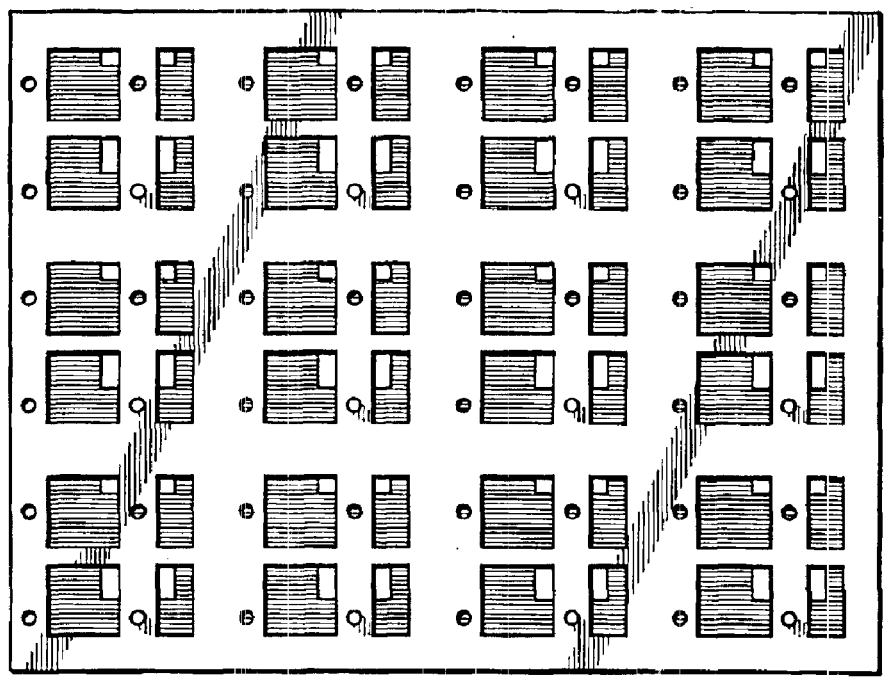
Figure 12:
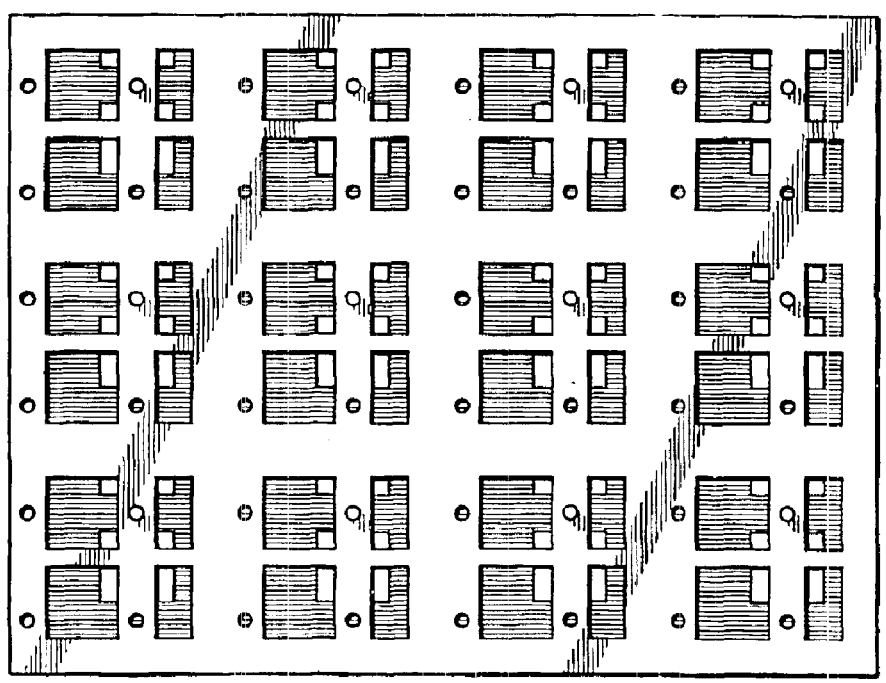
Figure 13:
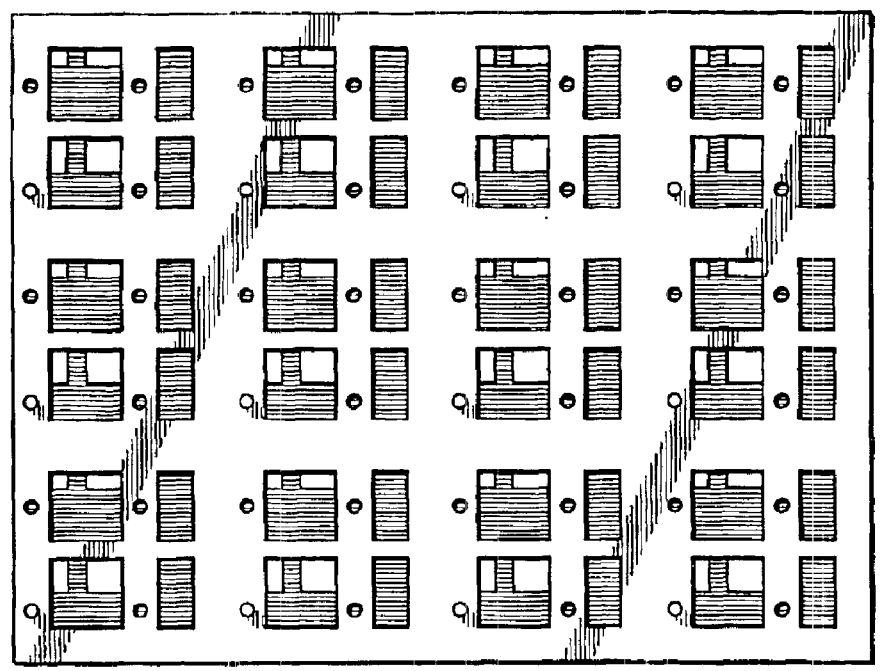
Figure 14:
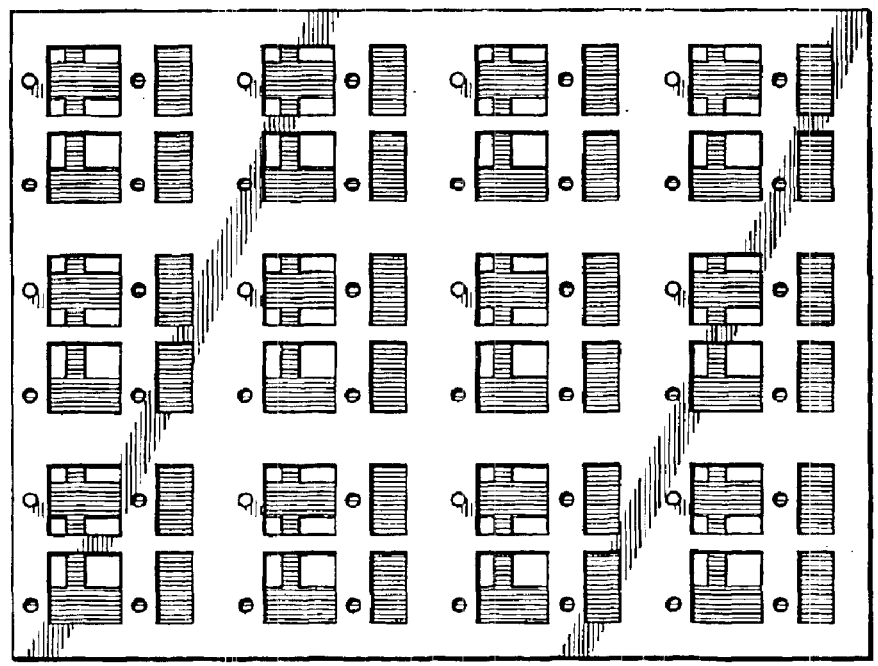
Figure 15:
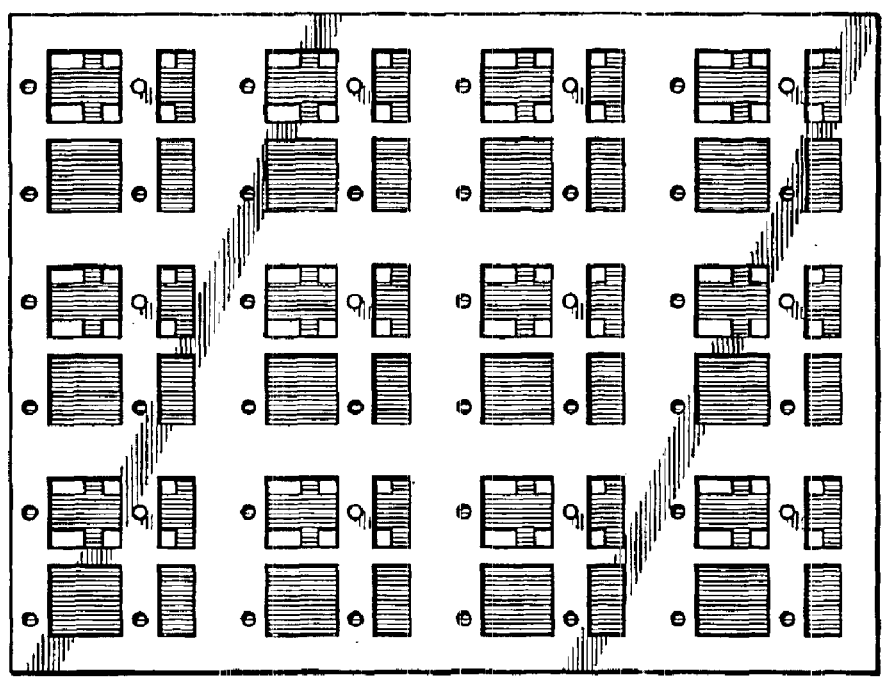
Figure 16:
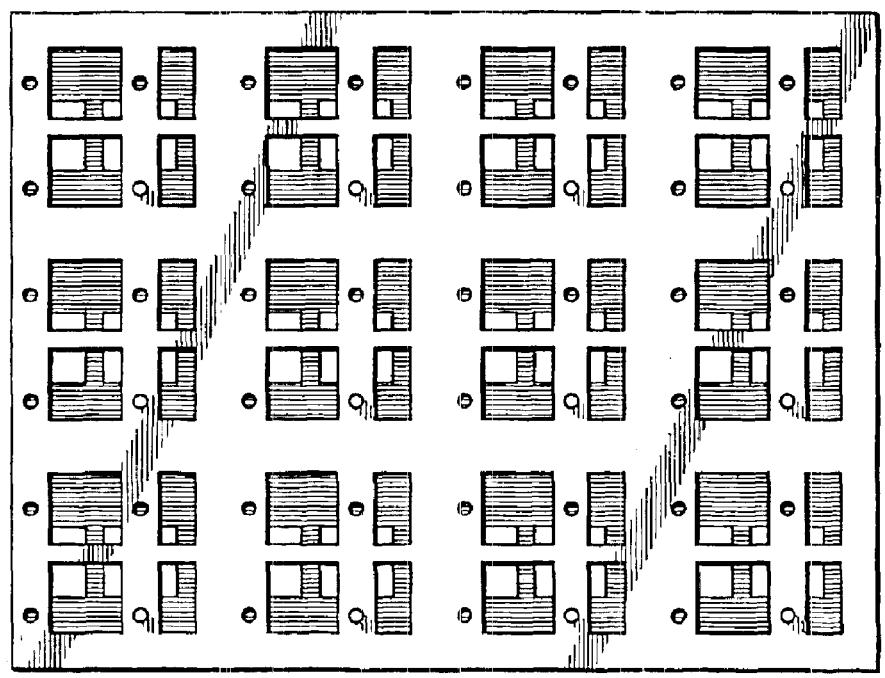
Figure 17:
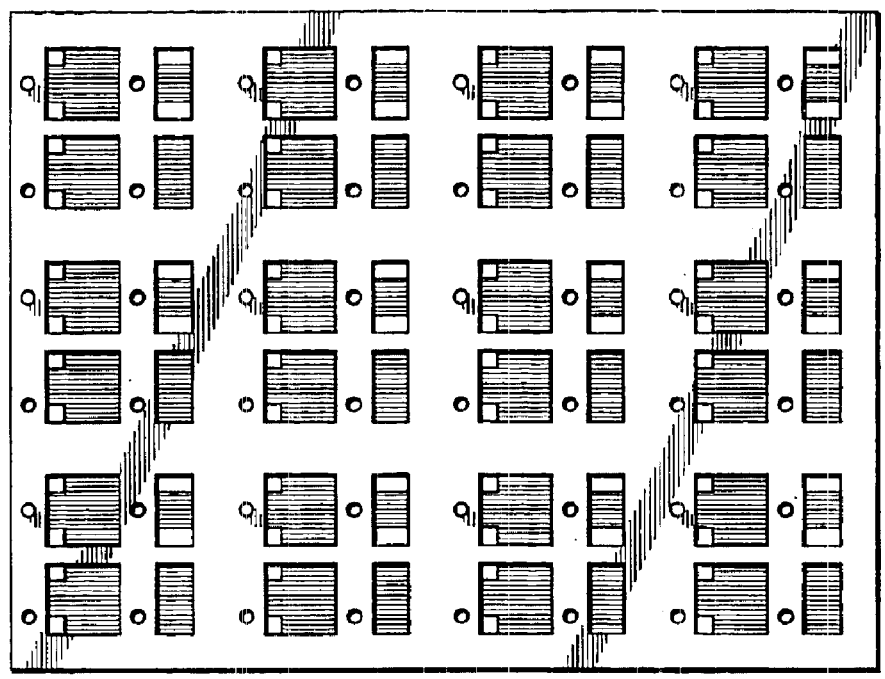
Figure 18:
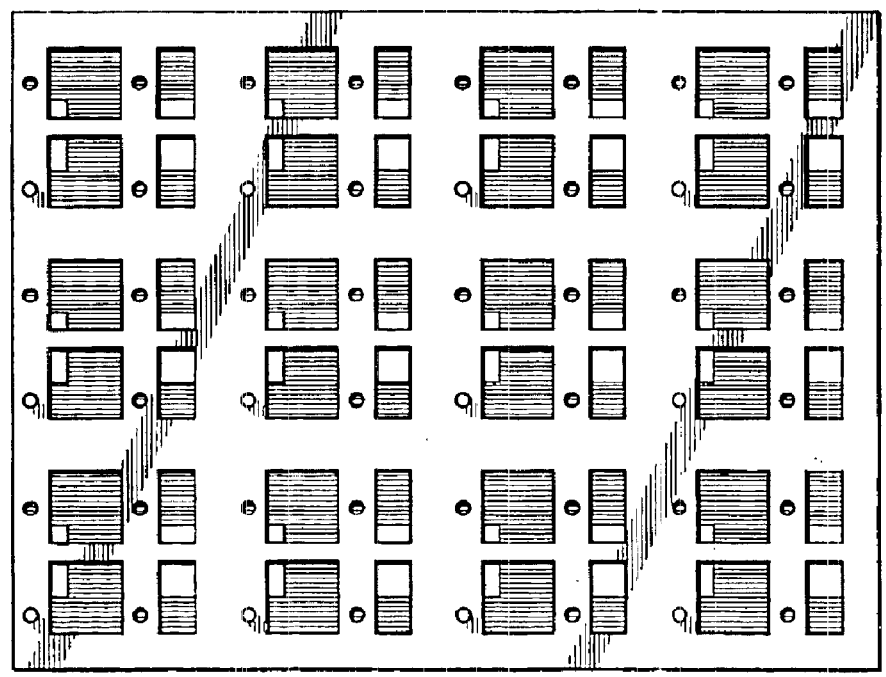

Both the pins 2 and the holes 8 are incorporated into the tile according to the same symmetrical pattern. But because the pins 2 are twice as far apart as the holes 8, there are at least 16 different orientations in which these two tiles can be jointed together. These are shown in FIGS. 3–18. In these Figures, the darkened area within the apertures indicates the area of the aperture in one tile which is obstructed by the other tile. In FIGS. 4–18 one tile is moved from the orientation shown in FIG. 3 to a different orientation relative to the other tile, so that its pins engage the holes in the other tile differently. Because the holes and pins are to the same square pattern, with the square for the pins twice that of the holes, one tile can be moved one or two squares in each of the four different directions. The tile can also be rotated through four possible positions, and the pins will still engage into the holes.

For the different orientations shown in FIGS. 3–18 for a tile having the dimensions shown in Table 1, the approximate open areas shown in Table 2 can be calculated, as a percentage of the tile total area; the resulting measured permeabilities are also given. The permeabilities were measured in $m^3/hr/m^2$ using a Frazier Air Permeometer, available from Frazier Precision Instruments, Silver Spring, Md., USA, according to the method set out in ASTM D 737-96. The air orifice used was 2.54 cm square, and the air pressure differential was 12.7 mm water. Experience shows that the spread in permeability values measured by this technique on the same fabric can be at least plus or minus 5%.

TABLE 1

| Tile Property | Value | Tile Property | Value |
|---|---|---|---|
| Overall length | 108 mm | Large aperture width | 3.0 mm |
| Overall width | 54 mm | Large Aperture length | 3.0 mm |
| Thickness | 1 mm | No. of Small apertures | 288 |
| Pin to pin | 9.0 mm | No. of Large apertures | 288 |
| Small aperture width | 1.5 mm | Aperture sets per tile | 72 |
| Small aperture length | 3.0 mm | | |

TABLE 2

| FIG. No. | Open Area | Permeability |
|---|---|---|
| 3 | 27 | 10,017 |
| 4 | 17.3 | 6,544 |
| 5 | 19.2 | 7,239 |
| 6 | 17.3 | 6,307 |
| 7 | 16.0 | 5,941 |
| 8 | 18.2 | 6,764 |
| 9 | 14.4 | 5,429 |
| 10 | 16.0 | 5,850 |
| 11 | 14.4 | 5,265 |
| 12 | 10.1 | 3,729 |
| 13 | 7.7 | 2,852 |
| 14 | 5.2 | 1,938 |
| 15 | 14.4 | 5,301 |
| 16 | 12.3 | 4,552 |
| 17 | 7.7 | 2,833 |
| 18 | 10.1 | 3,802 |

It can thus be seen that even for such a relatively simple tile design, by choosing carefully the orientation of the tiles in one layer relative to the tiles other a wide range of permeabilities is available.

For the tiles shown in FIGS. 1 and 2 the different open areas are obtained by orienting differently two sets of asymmetrically located apertures located in two separate asymmetrical patterns, and a combination of pins and holes located symmetrically. An alternative arrangement is shown in FIGS. 19 and 20.

Figure 19:
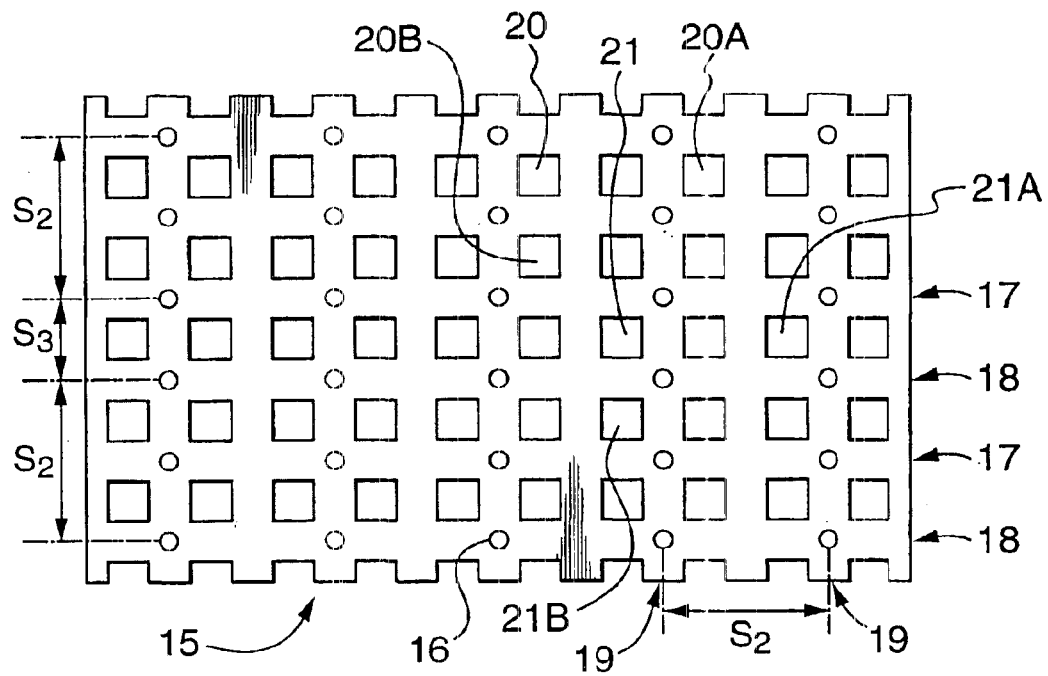
FIGS. 19 and 20 show a pair of different tile designs.
Figure 20:
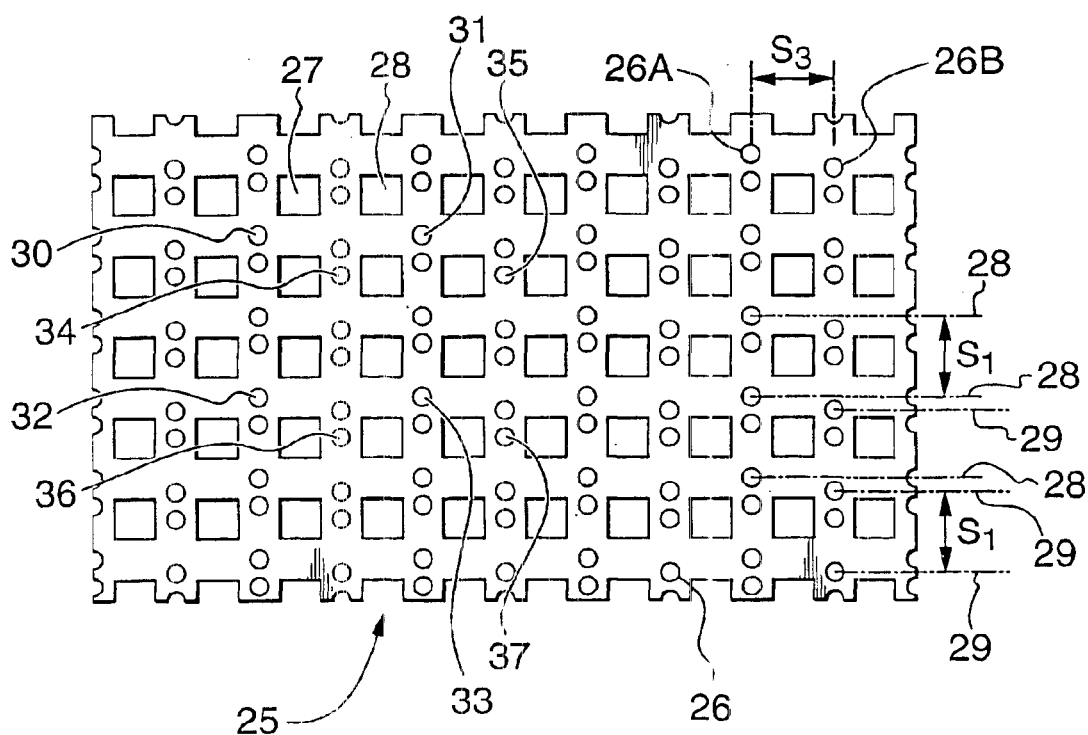

The tile shown generally as 15 in FIG. 19 is substantially rectangular. Upstanding pins 2 are incorporated into the tile 15 at selected locations. The pins 2 are the male half of the jointing structure which holds the two plies together. The pins 2 are arranged in pairs of rows which extend in the directions of the arrows 17 and 18 and in columns which extend in the direction of the arrows 19. The separation between the rows 17 is $S_2$, and the separation between the rows 18 is also $S_2$. The separation between an adjacent pair of rows 17 and 18 is $S_3$. The separation between the columns 19 is the distance $S_2$. The relationship between $S_2$ and $S_3$ is that $S_2=2S_3$. It can thus be seen that the pins 16 are arranged in two symmetrical patterns which are the same, for each of which the grid pattern is a repeating square. The minimum space defined by the grid pattern is one square with a pin 16 at each corner; if desired, a larger defined space including several squares can be used.

The tile 15 also includes two sequences of apertures, not one, each of which is to an asymmetrical pattern.

The first sequence of apertures 20 is placed in the tile at secondary selected locations. Inspection of FIG. 19 shows that the distance between adjacent apertures 20, for example between apertures 20 and 20A in one direction, and between apertures 20 and 20B in another direction, is not the same: the secondary locations selected for the sequence of apertures 20 conform to a second asymmetrical pattern.

The second sequence of apertures 21 is placed in the tile at tertiary selected locations. Inspection of FIG. 19 also shows that although the apertures 20 and 21 are the same size and shape, the distance between apertures 21 and 21A in one direction, and between apertures 21 and 21B in another direction, is not constant: the tertiary locations selected for the sequence of apertures 21 conforms to a third asymmetrical pattern. It can also be seen that this tile includes four patterns: the first pattern is symmetrical and is used twice, and the second and third patterns are each asymmetrical. In this instance, the second and third patterns are also substantially the same, and are located differently with respect to the grid pattern. Further inspection of this tile shows that combination of the areas of all the apertures 20 and 21 gives an open area of approximately 25% of the tile area.

The tile 25 shown in FIG. 20 includes holes 26, which are the female half of the jointing structure, and two sets of apertures 27 and 28 which are each arranged to the same asymmetrical patterns as the apertures 20 and 21 respectively in the tile 15. Maximum open area is therefore obtained when the fabric is assembled with apertures 20 and 21 located directly above apertures 28 and 27 respectively. The arrangement of the holes 26 is more complex. The holes 26 are arranged in columns, which are the distance $S_3$ apart as shown at 26A and 26B: the columns are thus set at half the distance $S_2$ used for the square pattern for the pins 16 in tile 15. The holes 26 are also arranged in two sets of rows, as at 28 and 29 which correlate with the notional lines forming the axes of the square grid pattern. The spacing between adjacent rows 28 and 29 is not the same, and hence the overall pattern appears to be asymmetric. However, the distance between pairs of rows 28 and between pairs of rows 29 is the same, and is $S_1$. Hence when the columns 26 and the rows 28 and 29 are combined it can be seen that there are two symmetrical square patterns of holes, one of which is off set a short distance along the axis of the notional grid defined by the first set of jointing structures. The locations 30, 31, 32 and 33 correspond to one square, and the locations 34, 35, 36 and 37 correspond to a second one. Since the relationship between $S_1$ and $S_2$ still is $S_2=2S_1$, the pins 16 in tile 15 will engage with either of the two sets of holes 26A or 26B in tile 25. It can also be seen that in the tile 25 the notional lines of the grid pattern defined by the location of the pins 30, 31, 32 and 33 do not pass through the apertures, whereas the notional lines of the grid pattern defined by the location of the pins 34, 35, 36 and 37 do pass through the apertures.

Inspection of FIGS. 19 and 20 shows that there are at least four ways in which the tiles 15 and 25 can be jointed together, to give at least four different levels of open area. With this pair of tiles, it is possible to obtain zero % open area.

Comparison of tiles 1, 7 as one pair, and tiles 15 and 25 as a second pair shows that there is a great deal of flexibility in how the inter-relationship is chosen between the symmetrical pattern for the jointing structures, and the asymmetrical pattern for the apertures.

Figure 21:
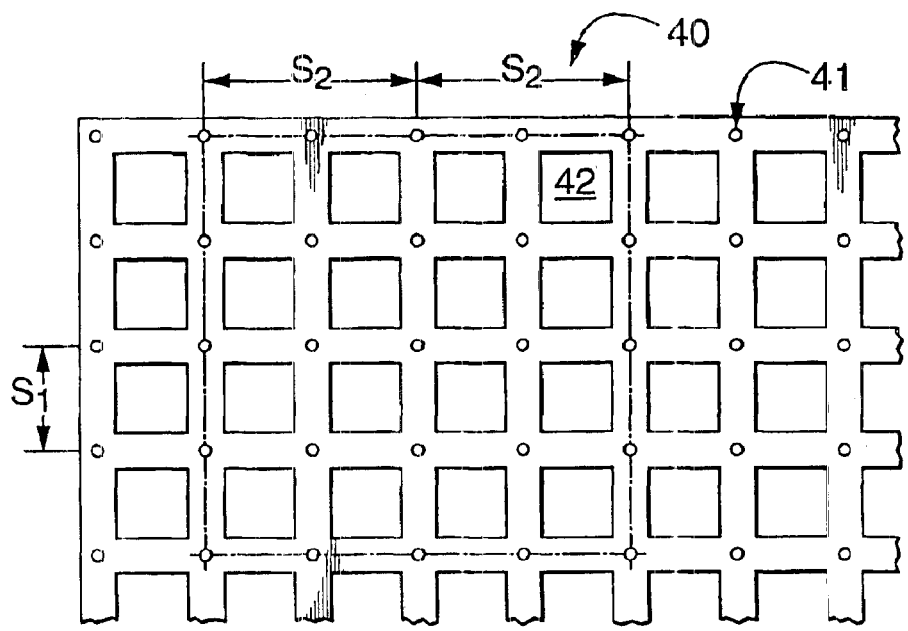
FIG. 21 shows a tile in which the apertures are to a symmetrical pattern.

A further possibility is illustrated in FIG. 21. In the tile 40 shown in FIG. 21 the jointing structures as at 41 are arranged to the same pattern as that used in tiles 1 and 7 discussed above. The tile 40 includes one set of apertures 42, which are located in a symmetrical pattern within the notional grid lines set by the jointing structures 41. This has the same dimension as in tiles 1 and 7; the distances $S_1$ and $S_2$ are the same in all three tiles. It then follows that a tile having the symmetrical pattern of apertures shown in tile 40 can be engaged to tiles having the same patterns as tiles 1 and 7. However due to the symmetrical pattern chosen for the apertures 42 the number of ways in which tile 40 can be oriented relative to either of tiles 1 or 7 is far fewer, and hence the choices for fabric open area percentage are far fewer.

In the five tiles 1, 7, 15, 25 and 40 the jointing structures define an essentially square area arranged on an essentially square grid, in which the notional grid axes are perpendicular. The symmetrical patterns in these tiles all have two axis symmetry. This invention is not limited to patterns which require the axes of the grid pattern to be perpendicular to each other. It is possible to use at least three axis symmetry, with the jointing structures located in a pattern for which the repeating unit in the grid pattern is a regular hexagon.

Figure 22:
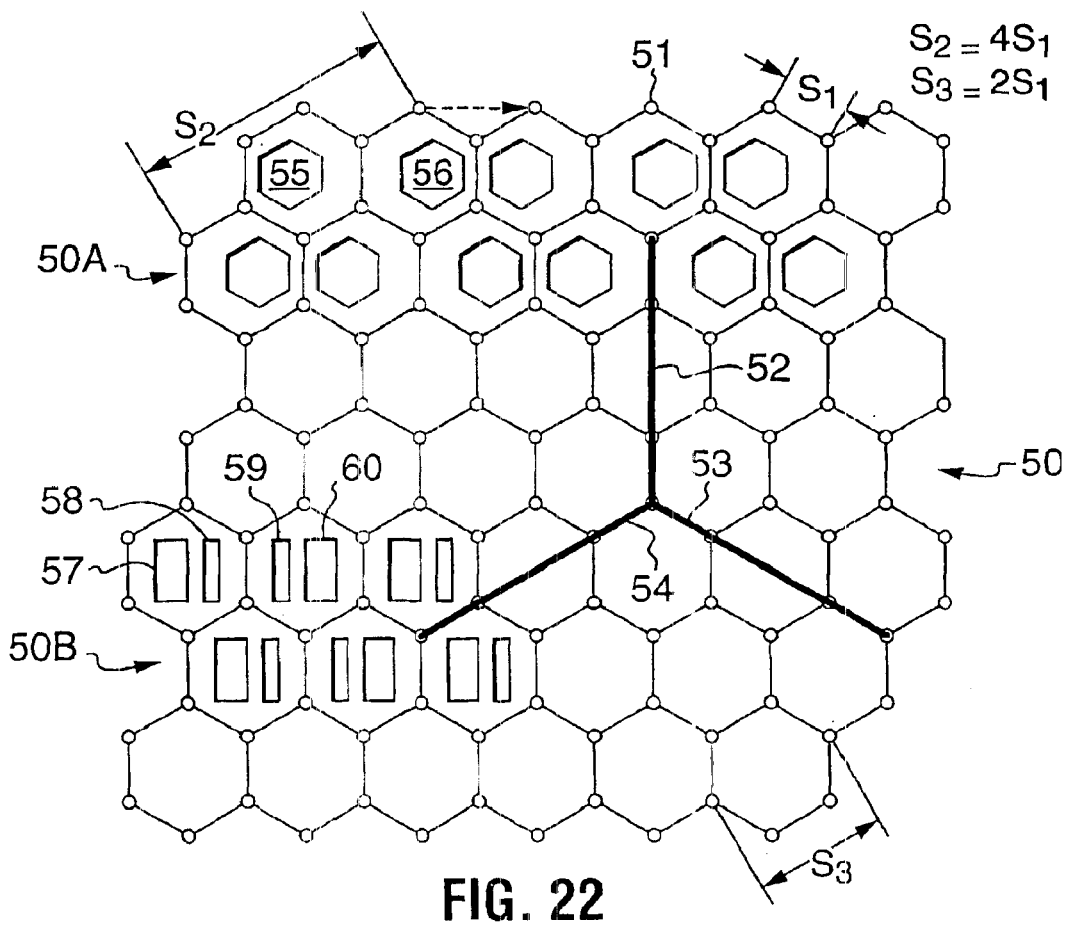
FIG. 22 shows two possible tile designs using three axis symmetry.

A tile incorporating three axis symmetry is shown in FIG. 22. Two possible aperture arrangements are also shown. In the part tile 50 in FIG. 22 the jointing structures 51 are located in a hexagonal arrangement, which is symmetrical. The grid defined by those structures then has three axes, as shown schematically at 52, 53 and 54. When engaging tiles of this type there are six possible different orientations obtainable by rotating one tile relative to the other, instead of the four orientations obtained with a square grid pattern. The relationship between the separation $S_1$ of adjacent structures and the separation of the notional grid lines is different: in tile 50 the relationships are $S_2=4S_1$, and $S_3=2S_1$. As shown, tile 50 also uses the same pin and hole jointing structure.

In tile 50 two possible aperture arrangements are shown. In the area 50A each hexagonal space includes a single hexagonal opening. Inspection of the are 50A shows that the apertures 55 and 56 are both off set in different directions relative to the sides of the hexagons, and are thus arranged to an asymmetrical pattern. In the area 50B each hexagonal space includes rectangular apertures. Inspection of the area 50B shows that the large apertures 57 and 60 are both off set in different directions relative to the sides of the hexagons, and are thus arranged to an asymmetrical pattern. Similarly, the small apertures 58 and 59 are both off set in different directions relative to the sides of the hexagons, and are thus arranged to a similar but different asymmetrical pattern. To assemble a fabric, any combination of the options 50A and 50B can be taken. By combining the six possible rotation orientations, with lateral movement along the three grid axes, a multitude of possible pairings are available.

In the tiles 1, 2, 15, 25, 40 and 50 the jointing structure is a simple pin and cooperating hole arrangement. Many other possible jointing structures have been described. Some of these, as in the pin and hole, require two different structures, and others do not, the joint being made between two structures which are the same. The only limitations on the jointing structures are that first that they can be engaged to provide a joint with adequate strength, and second that they can be incorporated into the tiles at the selected locations with sufficient accuracy.

What is claimed is:

1. An industrial fabric having a preselected permeability, including at least a first ply, consisting of a first set of tiles, and a second ply, consisting of a second set of tiles, attached to each other, each of which plies includes a plurality of tiles, wherein:

(a) each tile includes integral jointing structures incorporated into the tile at primary selected locations in a first symmetrical pattern which also defines a grid pattern on at least one surface of the tile;

(b) each tile in the first set of tiles includes at least a first sequence of apertures of the same size and shape incorporated into the tile at secondary selected locations in a second pattern;

(c) each tile in the second set of tiles includes at least a second sequence of apertures of the same size and shape incorporated into the tile at tertiary selected locations in a third pattern;

(d) the jointing structures incorporated into each tile comprise formed structures which engage with, and interlock with, each other to provide a joint between superposed tiles;

(e) in the assembled fabric the first symmetrical pattern extends in the plane of each ply;

(f) in the assembled fabric the second and third patterns both extend in the plane of each ply;

(g) at least one pattern chosen from the group consisting of the second pattern and the third pattern is asymmetrical with respect to the symmetry axes of the first pattern; and (h) the superposed plies are jointed together with the first symmetrical pattern and second pattern in the first ply oriented relative to the first symmetrical pattern and the third pattern in the second ply to provide an assembled fabric with the preselected permeability.

2. A fabric according to claim 1 wherein the both the second pattern and the third pattern are asymmetrical with respect to the symmetry axes of the first pattern.

3. A fabric according to claim 1 wherein the second pattern is symmetrical and the third pattern is asymmetrical with respect to the symmetry axes of the first pattern.

4. A fabric according to claim 1 wherein the relationship between the tiles in the first set and the tiles in the second set is one member chosen from the group consisting of:

(i) the tiles in the first set and the tiles in the second set are the same, and both the second pattern and third pattern are asymmetrical with respect to the symmetry axes of the first pattern;

(ii) in the tiles in the first set and the tiles in the second set, the second pattern is not the same as the third pattern;

(iii) in the tiles in the first set and in the tiles in the second set, the apertures in the first sequence are the same shape as the apertures in the second sequence, the apertures in the first sequence are not the same size as the apertures in the second sequence, and both the second pattern and third pattern are asymmetrical with respect to the symmetry axes of the first pattern;

(iv) in the tiles in the first set and in the tiles in the second set, the apertures in the first sequence are the same shape as the apertures in the second sequence, the apertures in the first sequence are not the same size as the apertures in the second sequence, and the second pattern is not the same as the third pattern;

(v) in the tiles in the first set and in the tiles in the second set, the apertures in the first sequence are not the same shape as the apertures in the second sequence, the apertures in the first sequence are not the same size as the apertures in the second sequence, the second pattern is the same as the third pattern, and both the second pattern and third pattern are asymmetrical with respect to the symmetry axes of the first pattern;

(vi) in the tiles in the first set and in the tiles in the second set, the apertures in the first sequence are not the same shape as the apertures in the second sequence, the apertures in the first sequence are not the same size as the apertures in the second sequence, and the second pattern is not the same as the third pattern;

(vii) in the tiles in the first set the sequence of apertures in the second pattern is within a space defined by the grid pattern;

(viii) in the tiles in the first set the sequence of apertures in the second pattern is not within a space defined by the grid pattern;

(ix) in the tiles in the second set the sequence of apertures in the third pattern is within a space defined by the grid pattern; and (x) in the tiles in the second set the sequence of apertures in the third pattern is not within a space defined by the grid pattern.

5. A fabric according to claim 1 wherein the fabric includes a first set of tiles forming the first ply, and a second set of tiles forming the second ply, wherein:

(a) in the tiles of the first set, each tile includes integral jointing structures incorporated into the tile at first primary selected locations in a first symmetrical pattern defining a first grid pattern;

(b) in the tiles of the second set, each tile includes integral jointing structures incorporated into the tile at second primary selected locations in a first symmetrical pattern defining a second grid pattern; and (c) the linear separation $S_2$ of adjacent jointing structures on an axis of the first grid pattern is related to the linear separation $S_1$ of adjacent jointing structures on the same axis of the second grid pattern by the relationship $S_2 = nS_1$, in which n is an integral number.

6. A fabric according to claim 5 wherein the second and third patterns are the same, and both the second pattern and third pattern are asymmetrical with respect to the symmetry axes of the first pattern.

7. A fabric according to claim 1 wherein the fabric includes a first set of tiles forming the first ply, and a second set of tiles forming the second ply, wherein:

(a) in the tiles of the first set, each tile includes integral jointing structures incorporated into the tile at first primary selected locations in a first symmetrical pattern defining a first grid pattern;

(b) in the tiles of the second set, each tile includes integral jointing structures incorporated into the tile at second primary selected locations in a first symmetrical pattern defining a second grid pattern;

(c) the linear separation $S_2$ of adjacent jointing structures on an axis of the first grid pattern is related to the linear separation $S_1$ of adjacent jointing structures on the same axis of the second grid pattern by the relationship $S_2 = nS_1$, in which n is an integral number;

(d) each tile in both the first set and the second set includes a first sequence of apertures incorporated into the tile at first secondary selected locations in a fourth pattern;

(e) each tile in both the first and the second set includes a second sequence of apertures incorporated into the tile at second secondary selected locations in a fifth pattern; and (f) at least one pattern chosen from the group consisting of the fourth pattern and the fifth pattern is asymmetrical with respect to the symmetry axes of the first pattern.

8. A fabric according to claim 7 wherein both the fourth pattern and the fifth pattern are asymmetrical with respect to the symmetry axes of the first pattern.

9. A fabric according to claim 1 wherein the tiles include a jointing structure including a first part and a cooperating second part, the first set of tiles includes the first part of the jointing structure, and the second set of tiles includes the second part of the jointing structure.

10. A fabric according to claim 9 wherein the first part of the jointing structure is the same as the second part of the jointing structure.

11. A fabric according to claim 10 wherein the first part of the jointing structure is not the same as the second part of the jointing structure.

12. A fabric according to claim 1 wherein the tiles include a jointing structure including a first part and a cooperating second part, the first set of tiles includes both the first part and the second part of the jointing structure, and the second set of tiles includes both the first part and the second part of the jointing structure.

13. A fabric according to claim 12 wherein the first part of the jointing structure is the same as the second part of the jointing structure.

14. A fabric according to claim 12 wherein the first part of the jointing structure is not the same as the second part of the jointing structure.

15. A fabric according to claim 1 wherein in the set of tiles of at least one ply the first symmetrical pattern is incorporated twice at primary first locations, and at primary second locations, and the primary first locations are separated from the primary second locations along an axis of the grid pattern.

16. A fabric according to claim 1 wherein the first symmetrical pattern has two axis symmetry, and the grid pattern is a sequence of squares.

17. A fabric according to claim 1 wherein the first symmetrical pattern has three axis symmetry, and the grid pattern is a sequence of regular hexagons.

* * * * *